United States Patent Office 2,956,979
Patented Oct. 18, 1960

2,956,979

COMPOSITION COMPRISING POLYETHYLENE AND AN ALKYLOL AMIDE

Stanley P. Rowland, Cincinnati, and Harry Braus, Springdale, Ohio, assignors to National Distillers and Chemical Corporation, a corporation of Virginia No Drawing. Filed Nov. 29, 1957, Ser. No. 699,454

3 Claims. (Cl. 260—32.6)

The present invention relates to a plastic composition of matter and, particularly, to a polyolefin such as a solid polyethylene, polypropylene, polyisoprene, etc. compositions having improved properties, with respect to blocking, imparted by incorporating an amide from a defined group of amides which, in certain instances, also impart improved properties with respect to reducing the coefficient of friction of such compositions.

As is known to those skilled in the art, one of the major drawbacks of certain plastic compositions, such as polyethylene (e.g., thin films), is that they possess a high film-to-film coefficient of friction as well as a tendency to block, i.e., for two or more film surfaces of solid polyethylene to adhere to each other while standing under pressure. In accordance with this invention, plastic compositions, and particularly polyethylene that have a tendency to block, are inhibited against blocking tendencies by incorporating into such compositions a small amount, based on the weight of the plastic, of a compound of the following structure:

$$R-N\begin{matrix}H\\R'-OH\end{matrix}$$

wherein R is a saturated aliphatic acyl radical of from 18 to 30 carbon atoms and R' is an alkyl group of 1 to 6 carbon atoms. Thus, as a specific example, R may be the acyl residue of stearic acid, palmitic acid, and others. As for the R' group, examples thereof include groups such as

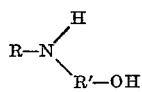

and others with particularly suitable embodiments thereof being

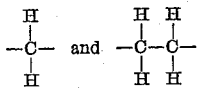

Thus, a particularly suitable embodiment of a N-hydroxylalkyl amide for practice of this invention is N-ethanol stearamide of the formula

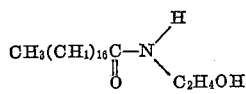

In general, the amount of the N-hydroxylalkyl amide compound utilized for incorporation into the plastic compositions which are to be inhibited against blocking may be varied depending on the desired reduction in blocking characteristics. Thus, the stated N-hydroxylalkyl amide may be used in amounts of from about 0.01% to about 0.5%, by weight of the plastic, and preferably in amounts of from 0.02 to 0.2%.

The composition may be prepared by any of several suitable methods known to those skilled in the art for providing uniform mixtures of the plastic material and additive materials to impart to desired property. Such methods include, as applied to this invention, the addition of the stated amide as a solid, in solution in an inert solvent, or as a slurry in a non-solvent to the plastic in either dry fluff or molding powder form followed by drying and tumbling. The amide may also be incorporated in the plastic by melt blending the ingredients in conventional apparatus, such as a Banbury mixer, heated rolls, etc.

In order to illustrate the marked improvement, against blocking tendencies of plastic substances, provided by this invention, the following tabulation sets forth results obtained, using for illustrative purposes a polyethylene having a tendency to block, by subjecting to measurement for blocking tendencies, a (1) virgin, solid polyethylene and (2) such a polyethylene to which the stated amount by weight of the alkylol stearamide was incorporated by fusing the polyethylene in a Banbury mixer, after which the fused polyethylene was admixed with the stated stearamide and mixing continued for one to two minutes (250 to 300° F.). The homogenized concentrate was then removed from the Banbury and granulated. The concentrate of polyethylene-alkylol stearamide was extended with polyethylene to the desired concentration by dry blending, and the resulting mixture was extruded into 1.5 mil blown film.

For measurement of blocking characteristics for which results are set forth in the following tabulation, two squares of polyethylene film conditioned in the following manner were employed: A "sandwich" was prepared consisting of plate glass (4 x 4 inches), aluminum foil, polyethylene film 5 x 5 1.5 mils thick, bond paper frame of 5 x 5 inch outside dimension with a 4 x 4 inch hole cut out, polyethylene film 5 x 5 inch 1.5 mils thick, aluminum foil, plate glass (4 x 4 inches), and a 4 inch diameter lead weight (4 lbs.). The "sandwich" was heated in an air circulated oven at 75° C. for fifteen minutes and removed from the oven. The weight, glass, and aluminum foil were then removed immediately and the polyethylene film sandwich smoothed onto the lower of two 4 x 4 inch aluminum plate-jaw assemblies which had double sensitive masking tape taped on the surface and the lower aluminum plate-jaw assembly fastened in the crosshead of an Instron tensile tester. The lower jaw with the polyethylene sandwich was then raised up to meet the top aluminum plate, and the paper was then removed leaving a ½ inch border of film to be secured to the back side of each plate with the masking tape. The force required to separate the two layers of film was then recorded as the crosshead with the bottom jaw was lowered.

|  | Grams Blocking/16 in.² | |
|---|---|---|
|  | A | B |
| Virgin Polyethylene | 430 | [1] 543 |
| Virgin Polyethylene plus 0.025% ethanol stearamide | 160 |  |
| Virgin Polyethylene plus 0.075% ethanol stearamide | 20 |  |
| Virgin Polyethylene plus 0.125% N-methanol stearamide |  | 27 |

[1] Average.

Although the stated N-hydroxylalkyl amides embodied for use herein are incorporated into plastic compositions to effect a marked improvement against tendencies of the plastic to block, and hence such additives are used mainly for that purpose, it has been found that certain of such additives also have a tendency to function as a slip agent, i.e., reduce the coefficient of friction. Thus, for example, use of ethanol stearamide and methanol stearamide in a virgin polyethylene have been found to also reduce the coefficient of friction of polyethylene as measured by pulling a 33 gram metal sled enveloped in the polyethylene film to be measured at a constant speed (20 inches/ minute) across another strip of the polyethylene film to be measured and, by use of an Instron tensile tester, the force of friction was measured at a temperature of 73° F. and 50% relative humidity on runs with virgin polyethylene and virgin polyethylene containing the alkylol stearamide, such films having been aged at such conditions for 24 hours.

The following data illustrates the improvement obtained, with respect to slip properties, by use of the stated stearamides.

|  | Coefficient of Friction | |
| --- | --- | --- |
|  | A | B |
| Virgin Polyethylene | 1.04 | [1] 0.89 |
| Virgin Polyethylene plus 0.025% ethanol stearamide | 0.63 |  |
| Virgin Polyethylene plus 0.125% methanol stearamide |  | 0.33 |
| Virgin Polyethylene plus 0.125% ethanol stearamide |  | 0.34 |

[1] Average.

In general, investigations with additive substances for imparting anti-block or slip properties to plastic substances have shown that a good blocking agent is generally detrimental on the slip property of the film. However, as is shown by the foregoing data, certain of the amides embodied for use herein not only substantially improve the plastic with respect to blocking but, to a substantial extent, also generally impart slip properties.

Although the compositions of this invention are substantially comprised of a plastic substance containing a small amount of the stated amides, the compositions may also contain small amounts of other desired additives such as anti-oxidants, and others provided the additional ingredients are not present in amounts sufficient to substantially alter the effectiveness of the stated amides for inhibiting blocking.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A plastic composition comprising polyethylene and an alkylol amide selected from the group consisting of N-ethanol stearamide and N-methanol stearamide, said alkylol amide being employed in an amount of from about 0.001 to about 0.5% based on the weight of the polyethylene.

2. The plastic composition of claim 1 wherein said alkylol amide is N-ethanol stearamide.

3. The plastic composition of claim 1 wherein said alkylol amide is N-methanol stearamide.

References Cited in the file of this patent

UNITED STATES PATENTS

| 2,770,609 | Symonds | Nov. 13, 1956 |
| 2,773,852 | Rowe et al. | Dec. 11, 1956 |

UNITED STATES PATENT OFFICE
CERTIFICATE OF CORRECTION

Patent No. 2,956,979                              October 18, 1960

Stanley P. Rowland et al.

It is hereby certified that error appears in the above numbered patent requiring correction and that the said Letters Patent should read as corrected below.

Column 4, line 22, for "0.001" read -- 0.01 --.

Signed and sealed this 1st day of May 1962.

(SEAL)
Attest:

ERNEST W. SWIDER
Attesting Officer

DAVID L. LADD
Commissioner of Patents